US009123192B2

(12) United States Patent
Buntscheck et al.

(10) Patent No.: US 9,123,192 B2
(45) Date of Patent: Sep. 1, 2015

(54) METHOD AND DEVICE FOR PROCESSING BANKNOTES

(75) Inventors: Wilhelm Buntscheck, Wolfratshausen (DE); Dieter Stein, Holzkirchen (DE); Kurt Wilfer, Oberschleissheim (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 1305 days.

(21) Appl. No.: 11/664,797

(22) PCT Filed: Oct. 10, 2005

(86) PCT No.: PCT/EP2005/010901
§ 371 (c)(1), (2), (4) Date: Jan. 28, 2008

(87) PCT Pub. No.: WO2006/040117
PCT Pub. Date: Apr. 20, 2006

(65) Prior Publication Data

US 2009/0001157 A1 Jan. 1, 2009

(30) Foreign Application Priority Data

Oct. 8, 2004 (DE) ........................ 10 2004 049 209

(51) Int. Cl.
*G06Q 40/00* (2012.01)
*G07D 11/00* (2006.01)
*G07F 19/00* (2006.01)
*G07D 7/00* (2006.01)

(52) U.S. Cl.
CPC .......... *G07D 11/0066* (2013.01); *G07D 7/0033* (2013.01); *G07D 11/0075* (2013.01)

(58) Field of Classification Search
CPC ....... G06K 7/14; G06K 2209/01; G06K 7/10; G06K 7/10881; G06K 7/10603; G06K 7/10663; G06K 7/10722; G06K 9/186; G06K 15/02; G06K 15/1857; G06K 19/06037; G06K 19/14; G06K 1/126; G06K 9/00288
USPC ............ 235/375, 380, 379; 382/100, 135, 23; 380/28
See application file for complete search history.

(56) References Cited

U.S. PATENT DOCUMENTS 6,212,285 B1 * 4/2001 Bender et al. ................. 382/100
6,343,138 B1 * 1/2002 Rhoads ......................... 382/100
(Continued)

FOREIGN PATENT DOCUMENTS

DE 198 24 435 12/1999
DE 102 39 226 3/2004
RU 31015 U1 7/2003

OTHER PUBLICATIONS

Search report of German Patent Office regarding Patent Application No. 10 2004 049 209.3, Nov. 2005.

*Primary Examiner* — Thien T Mai
(74) *Attorney, Agent, or Firm* — Workman Nydegger

(57) ABSTRACT

A bank note processing apparatus processes bank notes by first singling the bank notes, then transporting the singled bank notes through a sensor device and on to several output units. Before delivering the bank notes to the output units, the bank notes are checked by evaluating data as well as determining and storing serial numbers of the bank notes, wherein the bank notes are delivered to the output units depending on the result of the checking. Further, in determining the serial numbers of the bank notes, a unique serial number is established for each bank note.

28 Claims, 2 Drawing Sheets

(56) References Cited

U.S. PATENT DOCUMENTS

| | | | | |
|---|---|---|---|---|
| 6,731,785 | B1 * | 5/2004 | Mennie et al. | 382/135 |
| 6,883,705 | B2 * | 4/2005 | Gebhardt | 235/379 |
| 7,201,340 | B2 * | 4/2007 | Dietrich et al. | 382/135 |
| 7,380,675 | B2 * | 6/2008 | Gubbey et al. | 235/375 |
| 2003/0132281 | A1 * | 7/2003 | Jones et al. | 235/379 |
| 2004/0001606 | A1 * | 1/2004 | Levy | 382/100 |
| 2004/0096058 | A1 * | 5/2004 | Cho et al. | 380/28 |
| 2004/0131230 | A1 * | 7/2004 | Paraskevakos | 382/100 |
| 2004/0232217 | A1 * | 11/2004 | Graef et al. | 235/379 |
| 2004/0238619 | A1 * | 12/2004 | Nagasaka et al. | 235/379 |
| 2004/0243806 | A1 * | 12/2004 | McKinley et al. | 713/176 |

* cited by examiner

METHOD AND DEVICE FOR PROCESSING BANKNOTES

FIELD OF THE INVENTION

The present invention concerns a method and an apparatus for processing bank notes.

BACKGROUND

When processing bank notes a stack of bank notes is inserted in an input pocket proceeding from which the bank notes are singled. The singled bank notes are transferred to a transportation system, checked by sensors and allocated to output pockets in dependence on the checking. Therein the bank notes are checked for authenticity, soiling, damage, type, etc. and sorted into the different output pockets depending thereon. Bank notes which were not recognized clearly or in an error-free manner are sorted into a special output pocket, a reject pocket.

In the processing of bank notes, the recognition of a serial number printed on the bank notes plays an increasingly important role, in order to e. g. improve the quality of processing.

From DE 102 39 226 A1 for example an apparatus and a method for checking bank notes is known, in which the serial numbers of the bank notes to be processed are detected by sensors and are determined by a control device. On the basis of the serial number it is determined for each bank note to which batch and/or issue the respective bank note belongs. Depending on the batch and/or issue, reference data are chosen for processing the respective bank note, which reference data take account of the specific properties of the respective batch and/or issue, whereby the quality of processing of the bank notes altogether is improved.

When serial numbers of bark notes are determined in the processing of the bank notes and are used for the processing operation or for other processes, e. g. the tracking of bank notes, it is of utmost importance to determine the serial numbers in a correct and error-free manner. In the case that the serial number is recognized incorrectly, the processing operation as well as the other processes are considerably impaired or rendered impossible.

SUMMARY

It is therefore the object of the present invention to specify a method and an apparatus for the processing of bank notes that permits a secure determination of serial numbers printed on the bank notes.

Therein, for the processing of bank notes, the invention starts out from singling the bank notes, transporting the singled bank notes through a sensor device to several output units, checking the bank notes by the evaluation of data as well as determining and storing serial numbers of the bank notes, subsequent to which the bank notes are transported to the output units depending on the result of the checking, wherein in the determination of the serial numbers of the bank notes a unique serial number is established for each bank note.

The advantage of the invention is above all to be seen in the fact that by establishing a unique serial number for each processed bank note a secure allocation of all processed bank notes is possible, since the bank notes are individualized by the unambiguously established serial numbers and can therefore be distinguished from each other at any time, whereby the processing of the bank notes altogether is improved.

In a development the processing of bank notes is to be improved also for the case that disturbances occur during the processing of the bank notes.

For this purpose the development provides the storing of the order of the determined serial numbers of the bank notes. Thereby a secure tracking and allocation of processed bank notes is still possible in the case that the processing is impaired by disturbances.

Further advantages of the present invention can be found in the dependent claims as well as the following description of one embodiment with reference to figures.

DETAILED DESCRIPTION OF VARIOUS EMBODIMENTS

Figure 1:
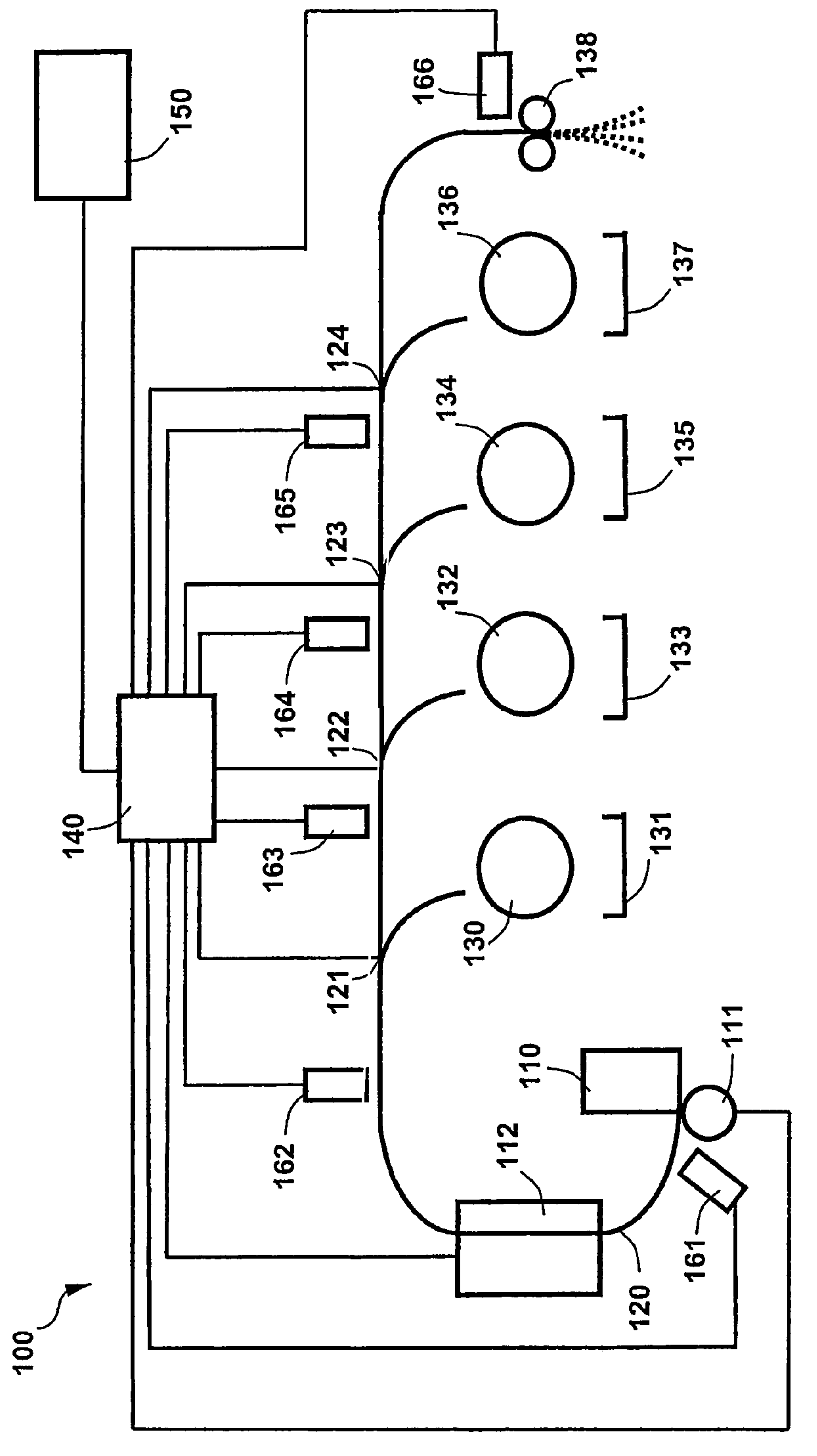
FIG. 1 a schematic structure of a bank note processing apparatus for processing bank notes, and FIG. 2 a determination of a serial number of a bank note.

FIG. 1 shows a schematic structure of a bank note processing apparatus 100 for processing bank notes.

The bank note processing apparatus 100 has an input unit 110, into which the bank notes or deposits are inserted. A singling device 111 is connected to the input unit 110, which singling device removes single bank notes from the input unit 110 and transfers them individually to a transportation system 120.

The transportation system 120 transports the individual bank notes through a sensor device 112, which determines data by means of sensors, which data for example permit conclusions about features of the respective bank note such as authenticity, state, type, i. e. the currency and denomination of the bank note, etc. The determined data of the bank note are transferred to a control device 140 which evaluates the data by means of stored reference data and allocates the determined features such as currency, denomination, authenticity, state, etc. to each processed bank note. On the basis of the determined features the further flow of the bank notes through the bank note processing apparatus 100 is controlled by the control device 140. For this purpose the control device 140 acts on diverters 121 to 124 which are part of the transportation system 120 and which permit to store the bank notes in output units 130 to 138 in accordance with the determined features. The output units 130 to 137 can for example be embodied as spiral slot stackers, which stack the bank notes to be stored onto deposit means 131, 133, 135, 137 by means of rotating units 130, 132, 134, 136 having spiral slots. The output unit 138 can be embodied as a shredder, e. g. in order to destroy bark notes which are no longer fit for bank note circulation.

The operation of the bank note processing apparatus 100 is controlled by means of an input/output device 150 having e. g. a display and/or a printer as well as a keyboard or a touch screen for this purpose.

The sensor device 112 can have a sensor which produces an image of the respective bank note, e. g. a CCD sensor, whose data are transferred to the control device 140 for further evaluation. To make sure that the serial number can always be recognized independently of the position of the bank notes, the sensor device 112 can also have a second CCD sensor, wherein the two CCD sensors are arranged in such a way that they detect both sides of the respective bank note. In a first step the control device 140 determines a section of the bank note containing the serial number. This can for example be done by determining the currency and the denomination, since the position of the serial number within the bank note is known. A further possibility is the use of an infrared sensor, since serial numbers are frequently printed using an ink which absorbs infrared light, so that the section of the bank note containing the serial number can be determined. In a second step, the control device 140 determines the serial number. For this purpose for example known methods for the recognition of characters can be used. The thus determined serial number can be used for the further processing. In addition, the determined features of the respective bank note, such as authenticity, state, currency, denomination, etc. can be allocated 140 the serial number and can be stored together with the serial number in the control device 140 for the further processing.

Problems in the processing of bank notes in the bank note processing apparatus 100 can arise when disturbances such as jams etc. occur. For the detection of disturbances the bank note processing apparatus 100 can for example have detectors 161 to 166, e. g. light barriers. The light barriers 161 to 166 are arranged along the transportation system 120 and enable the supervision of the proper processing of the individual bank notes in the bank note processing apparatus 100, from the input unit 110 to the output units 130 to 137 or to the shredder 138. For this purpose the signals of the light barriers 161 to 166 are evaluated by the control device 140. When a disturbance is detected or assumed, the control device 140 can stop the further processing of bank notes by the bank note processing apparatus 100. For this purpose in particular the singling device 111, and optionally also the transportation system 120 additionally, is stopped. It can equally be provided that upon the occurrence of a disturbance the bank notes disposed in the transportation system 120 are transported to one of the output units 130 to 137 which is used as reject pocket, so that these bank notes can be processed separately, e. g. by an operator.

Such a disturbance can for example be a jam of the bank notes in the transportation system 120. A jam is detected by the control device 140 when e. g. an expected signal by one of the light barriers 161 to 166 is not provided after a predetermined period or when one of the light barriers 161 to 166 emits a permanent signal. The bank notes being processed at this time, e. g. the bank notes disposed in the transportation system 120, are subsequently for example removed by the operator and processed separately.

In the separate processing it can be provided that the operator has the serial numbers as well as the features allocated to the serial numbers, such as authenticity, state, currency, denomination, etc. of the respectively corresponding bank note shown by means of the display of the input/output device 150. By means of the serial number as well as of the allocated features the operator can identify the bank notes concerned by means of their serial numbers and can process them as intended, for example allocate them to a certain output unit. It is also possible thereby to restore the original order of the bank notes. For this purpose the operator reads the serial numbers of the bank notes and compares them to the order of the stored serial numbers. This is above all important when different deposits are processed by the bank note processing apparatus 100 simultaneously, to provide for the allocation of the bank notes to the respective deposit. Therein, the different deposits can be separated from each other by separator cards.

It can also be provided that the detectors 161 to 166 can detect the serial numbers of the bank notes to be processed, e. g. such as described above in connection with the sensor device 112. In this case the path of each individual bank note during the processing in the bank note processing apparatus 100 can be monitored comprehensively by the control device 140. In particular it is in this case not only possible to establish by means of the detector 166 arranged immediately in front of the shredder 138 that a bank note is destroyed, but the identity of the bank note can be established by means of the serial number.

Figure 2:
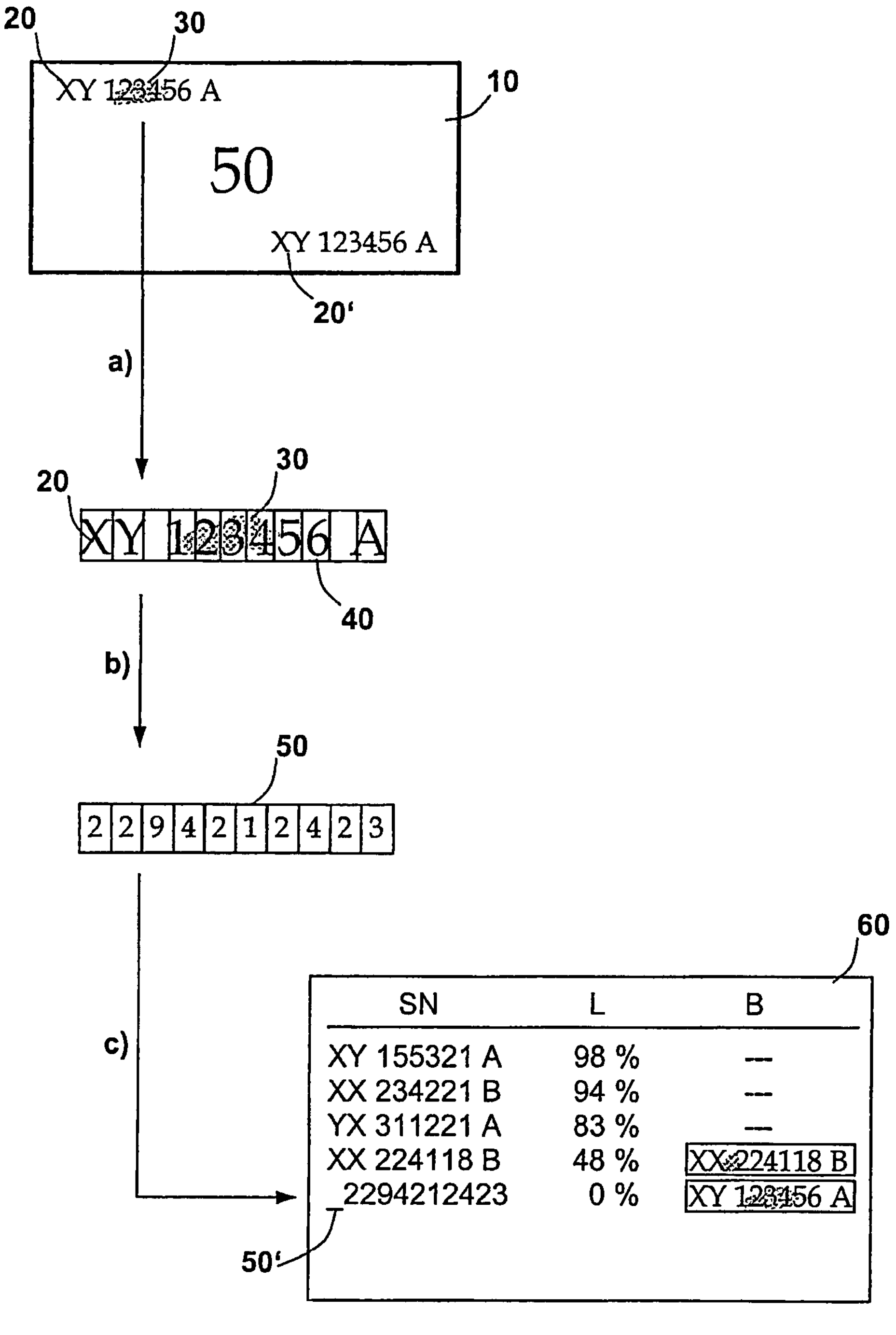

The detection of the serial numbers of bank notes is frequently problematic, e. g. since the serial number is partly covered. In FIG. 2 a bank note 10 with a serial number 20 is shown by way of example. A part of the serial number 20 is more or less strongly covered by a spot 30, rendering the recognition of the serial number 20 impossible. In the processing of the bank note 10 in the bank note processing apparatus 100 the data of the image of the bank note 10 are transmitted from the sensor device 112 to the control device 140.

In a first step a) the control device 140 establishes the position and the section 40 of the serial number 20 within the bank note 10, e. g. as described above.

In a second step b) a serial number 50 is determined on the basis of the image or of the section 40 established before by means of a method for the recognition of characters (OCR: optical character recognition).

In a third step c) the determined serial number 50 is stored in a database 60 of the control device 140 for the further processing SN.

In the database 60 further information concerning the serial number 20 or the respective bank note 10 can be stored in addition to the determined serial number 50. It can for example be stored how well the serial number 20 could be read or recognized. An information L concerning the readability or recognizability can e. g. be stored as a percentage information. In the case that the readability or recognizability is below a predetermined threshold value, e. g. 50%, a further information B characterizing the bank note 10 can be stored additionally. This information can be the image of the bank note 10 or a part of the image of the bank note 10, in particular the section 40 established for the serial number 20. Moreover, in the database 60 also the above-described features of the bank notes can be stored and linked with the respective serial number which is determined by the control device 140 on the basis of the data of the sensor device 112. Likewise, data of the sensor device 112 can be stored for each bank note.

In the case that the determination of the serial number 20 fails, e. g. since a part of the serial number 20 is covered by a spot 30 and cannot be recognized at all or not completely on the basis of the data of the sensor device 112 by means of OCR, a special algorithm can be used. This algorithm produces a unique identification on the basis of the image information (with spot) contained in the data of the sensor device 112, which identification can consist of alphanumeric characters. The special algorithm can furthermore e. g. divide the section 40 of the serial number 20 into individual rectangles. Within each rectangle the average brightness value is yielded from the image information contained therein, and the average brightness value is subsequently normalized to a one-digit number or a character. Instead of the average brightness value also other evaluations are thinkable, such as e. g. the most frequent brightness value in a rectangle or similar. Likewise, instead of rectangles, also a different division can be chosen. The string of the thus yielded alphanumeric characters results in the unique identification. To be able to recognize at once that it is a unique identification 50 and not a detected serial number 20, the unique identification 50 can be marked by a special character 50'.

In the case that the determination of the serial number 20 fails, e. g. since a part of the serial number 20 is covered by a spot 30 and can not be recognized at all or not completely, instead of the above-described procedure an individual and unique identification 50 can also be assigned in such a way that a random string of alphanumeric characters is produced, e. g. a random number. This unique identification 50 differs in particular from all serial numbers stored in the database 60 which were determined beforehand, also from the unique identifications assigned beforehand. It is thus made sure that the features of the bank note 10 allocated to the thus assigned identification 50 can be associated unequivocally with the corresponding bank note 10 on the occasion of a later checking. In the database 60 at least the image or the established section 40 is stored together with this unique identification 50, in order to enable the identification of the bank note 10 in the special processing on the basis of the stored image or the established section 40.

A further improvement of the recognition of the serial numbers of bank notes can be achieved through the evaluation of the check digits contained in the serial numbers by the control device 140. This can also be effected in addition to the above-described procedure.

It can be established through the evaluation of the check digit whether the recognized serial number is an admissible serial number. It is thus assured that the serial number was recognized correctly by the control device 140. However, in the case that it is established that the recognized serial number is not an admissible serial number, a unique identification 50 can be assigned and can be stored together with at least the established area 40—as described above. Particular check-digit systems also allow for the correction of one or several incorrectly recognized numbers and/or characters of the serial number recognized by the control device 140. It is thus rendered possible as an alternative or in addition to correct the faulty serial number instead of assigning a unique identification 50 for incorrectly recognized serial numbers. In known check-digit systems it is for example provided that a horizontal checksum is calculated of the digits of the serial number. In the case that the horizontal checksum has more than one digit, a horizontal checksum is calculated until the horizontal checksum is a one-digit number. This number is then compared to the check digit. If the horizontal checksum and the check digit correspond to each other, the serial number is correct. Also characters contained in the serial number can be taken account of in the calculation of the horizontal checksum, for this purpose a particular value or a particular number is assigned to the character, e. g. the location in the alphabet, thus 1 for A, 2 for B, etc.

A further improvement of the recognition of serial numbers is possible in the case that a serial number 20, 20' is applied to the bank note 10 several times. In this case, the serial numbers 20, 20' applied several times can be determined by the control device 140 in the above-described manner and can be compared by the control device 140. In case of differences the bank note is a forgery or suspected of forgery.

A divergence can indicate a forgery which was created on the basis of several authentic bank notes, wherein the authentic bank notes were cut into pieces and stuck together again. Therein the bank notes are cut into pieces in such a manner that the stuck-together forgeries are slightly smaller than an authentic bank note, whereby it is possible to compose e. g. 21 forgeries out of 20 bank notes, which forgeries as a rule have different serial numbers 20, 20'.

However, the occurrence of a difference can also indicate a faulty recognition of one of the serial numbers 20, 20' by the control device 140. If it can be ruled out by e. g. the checking of other features of the bank note that it is a forgery, it is possible to correct the faultily recognized serial number by means of at least one second, correctly recognized serial number, since due to the presence of several serial numbers 20, 20' more data are available for the evaluation by the control device 140.

The measures for the recognition of the serial number described for several serial numbers 20, 20' can also be carried out in addition to the above-described procedures. In the case that the serial number is applied to the bank note more than twice, of course further comparisons are possible.

It is obvious that instead of bank notes also other documents of value, such as checks, admission tickets, vouchers, separator cards, etc. can be processed in the above-described manner, provided that these have an individualization comparable to the serial number of bank notes.

In the above examples the processing of bank notes by means of a bank note processing apparatus was explained, which apparatus is suitable for the checking and sorting of bank notes. It is obvious that the described processing and recognition of serial numbers is also suitable for other bank note processing apparatus in which serial numbers are detected, e. g. bank note processing apparatus for depositing and/or paying out bank notes, etc.

The invention claimed is:

1. A method for the processing of bank notes, the method comprising the steps:
- singling the bank notes,
- transporting the singled bank notes through a sensor device to several output units,
- checking the bank notes by evaluating data of the sensor device,
- determining and storing of serial numbers of the bank notes by a control device, and
- transporting the bank notes into the output units, in dependence on the checking step,
- in determining the serial numbers of the bank notes, a unique serial number is established for each bank note and stored in a database;
- wherein the unique serial number established for each bank note is a detected serial number or a generated unique identification;
- wherein, in the case that any portion of the serial number for a bank note is indeterminable, generating and storing a unique identification for this bank note in the database as the unique serial number instead of a detected serial number;
- wherein the unique identification comprises at least one of a random string of digits and alphanumeric characters differing from all previously determined serial numbers stored in the database and from previously assigned unique identifiers.

2. The method according to claim 1, wherein an image or partial image of the bank note is stored together with the serial number or the unique identification.

3. The method according to claim 1, wherein the determined serial numbers are checked by means of check digits contained in the serial numbers.

4. The method according to claim 3, wherein serial numbers recognized as faulty in the checking step are corrected by means of one or several check digits.

5. The method according to claim 1, wherein serial numbers applied to the bank note several times are detected and the serial numbers are compared to each other.

6. The method according to claim 5, wherein, upon the occurrence of differences between the serial numbers compared, the bank note is classified as a forgery or as suspected of forgery.

7. The method according to claim 5, wherein, upon the occurrence of differences between the serial numbers compared, any incorrect serial number is corrected.

8. The method according to claim 1, wherein features of the bank note are allocated to the serial number of each bank note and are stored together with the serial number.

9. The method according to claim 1, wherein the order of serial numbers of the processed bank notes is stored.

10. An apparatus for processing bank notes, the apparatus comprising:

an input unit for inserting bank notes, a singling device for singling the inserted bank notes, a transportation system for transporting the singled bank notes, a sensor device for checking the singled bank notes, a control device for checking the bank notes by means of data of the bank notes provided by the sensor device and for determining the serial numbers of the bank notes, output units into which the bank notes are transported by the transportation system, controlled by the control device, in dependence on the checking by the control device, wherein the control device establishes a unique serial number for each bank note and stores the same in a database, the unique serial number established for each bank note being a detected serial number or a generated unique identification;

wherein, in the case that any portion of the serial number for a bank note is indeterminable, the control device generates and stores a unique identification for the bank note as the unique serial number instead of a detected serial number;

wherein the control device generates a random string of at least one of digits and alphanumeric characters for the unique identification which differs from all previously determined serial numbers stored in the database and from all previously assigned unique identifiers.

11. The apparatus according to claim 10, wherein the control device is arranged to store an image or partial image of the bank note together with the serial number or the unique identification.

12. The apparatus according to claim 10, wherein the control device is arranged to store the order of the serial numbers of the processed bank notes.

13. The apparatus according to claim 10, including several detectors connected to the control device which are arranged along the transportation system, which detectors are configured to detect the serial numbers of the bank notes.

14. A method for the processing of bank notes, the method comprising the steps:

singling the bank notes, transporting the singled bank notes through a sensor device to several output units, checking the bank notes by evaluating data of the sensor device, determining and storing of serial numbers of the bank notes by a control device, and transporting the bank notes into the output units, in dependence on the checking step, in determining the serial numbers of the bank notes, a unique serial number is established for each bank note, the unique serial number established for each bank note being a detected serial number or a generated unique identification;

wherein, in the case that any portion of the serial number for a bank note is indeterminable, generating and storing a unique identification for this bank note as the unique serial number instead of a detected serial number;

wherein the unique identification comprises at least one of a string of digits and alphanumeric characters derived from an image or a partial image of the bank note.

15. The method according to claim 14, wherein the image or partial image of the bank note is stored together with the serial number or the unique identification.

16. The method according to claim 14, wherein the determined serial numbers are checked by means of check digits contained in the serial numbers.

17. The method according to claim 16, wherein serial numbers recognized as faulty in the checking step are corrected by means of one or several check digits.

18. The method according to claim 14, wherein serial numbers applied to the bank note several times are detected and the serial numbers are compared to each other.

19. The method according to claim 18, wherein, upon the occurrence of differences between the serial numbers compared, the bank note is classified as a forgery or as suspected of forgery.

20. The method according to claim 18, wherein, upon the occurrence of differences between the serial numbers compared, any incorrect serial number is corrected.

21. The method according to claim 14, wherein features of the bank note are allocated to the serial number of each bank note and are stored together with the serial number.

22. The method according to claim 14, wherein the order of serial numbers of the processed bank notes is stored.

23. An apparatus for processing bank notes, the apparatus comprising:

an input unit for inserting bank notes, a singling device for singling the inserted bank notes, a transportation system for transporting the singled bank notes, a sensor device for checking the singled bank notes, a control device for checking the bank notes by means of data of the bank notes provided by the sensor device and for determining the serial numbers of the bank notes, output units into which the bank notes are transported by the transportation system, controlled by the control device, in dependence on the checking, wherein the control device establishes a unique serial number for each bank note, the unique serial number established for each bank note being a detected serial number or a generated unique identification;

wherein, in the case that any portion of the serial number for a bank note is indeterminable, the control device generates and stores a unique identification for them bank note as the unique serial number instead of a detected serial number;

wherein the control device generates a string of at least one of digits and alphanumeric characters for the unique identification, the digits and alphanumeric characters being determined on the basis of the data of the bank notes provided by the sensor device, the data corresponding to an image or a partial image of the bank note.

24. The apparatus according to claim 23, wherein the control device is arranged to store the image or partial image of the bank note together with the serial number or the unique identification.

25. The apparatus according to claim 23, wherein the control device is arranged to store the order of the serial numbers of the processed bank notes.

26. The apparatus according to claim 23, including several detectors connected to the control device which are arranged along the transportation system, which detectors are configured to detect the serial numbers of the bank notes.

27. The method according to claim 1, wherein a special character is included in the unique identification to distinguish the unique identification from a detected serial number.

28. The method according to claim 2, wherein the image or partial image of the bank note includes a section of the bank note established as the serial number of the bank note.

* * * * *